US008971790B2

(12) United States Patent
Agashe et al.

(10) Patent No.: US 8,971,790 B2
(45) Date of Patent: *Mar. 3, 2015

(54) METHOD AND APPARATUS FOR BROADCAST SERVICES IN A COMMUNICATION SYSTEM

(75) Inventors: Parag A. Agashe, San Diego, CA (US); Roy Franklin Quick, Jr., San Diego, CA (US); Jun Wang, La Jolla, CA (US); Raymond T. Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 843 days.

This patent is subject to a terminal disclaimer.

(21) Appl. No.: 12/550,129

(22) Filed: Aug. 28, 2009

(65) Prior Publication Data
US 2010/0048206 A1 Feb. 25, 2010

Related U.S. Application Data

(63) Continuation of application No. 10/335,626, filed on Jan. 2, 2003, now Pat. No. 7,599,655.

(51) Int. Cl.
*H04H 20/71* (2008.01)
*H04W 4/06* (2009.01)
(Continued)

(52) U.S. Cl.
CPC ............... *H04W 4/06* (2013.01); *H04H 20/26* (2013.01); *H04W 72/005* (2013.01); *H04W 36/12* (2013.01)
USPC ...... 455/3.01; 455/3.02; 455/179.1; 370/337; 370/352; 348/734

(58) Field of Classification Search
CPC ....................................................... H04W 4/06

USPC .............. 455/3.01, 3.02, 179.1, 185.1, 186.1, 455/418; 370/337, 352, 395, 537; 348/734
See application file for complete search history.

(56) References Cited

U.S. PATENT DOCUMENTS 4,163,255 A 7/1979 Pires
4,323,921 A 4/1982 Guillou
(Continued)

FOREIGN PATENT DOCUMENTS

CA 2308405 A1 11/2000
CN 1240317 A 1/2000
(Continued)

OTHER PUBLICATIONS

International Search Report PCT/US03/041311, International Search Authority-European Patent Office, Feb. 25, 2005.
(Continued)

*Primary Examiner* — Tuan H Nguyen
(74) *Attorney, Agent, or Firm* — Charles E. Eggers

(57) ABSTRACT

A method, apparatus and system provide for efficient use of communication resources for providing broadcast services in a communication system. A receiver receives a first broadcast controller identification from a first base station, and a second broadcast controller identification from a second base station. A controller coupled to the receiver determines whether the first and second broadcast controller identifications are associated with use of a common set of broadcast parameters. A transmitter transmits a request for transmission of a new set of broadcast parameters when the first and second broadcast controller identifications are not associated with use of the common set of broadcast parameters. After receiving the new set of broadcast parameters, the receiver uses the new set of broadcast parameters for receiving broadcast services.

16 Claims, 6 Drawing Sheets

(51) Int. Cl.
*H04H 20/26* (2008.01)
*H04W 72/00* (2009.01)
*H04W 36/12* (2009.01)

(56) References Cited

U.S. PATENT DOCUMENTS

| | | |
|---|---|---|
| 4,336,612 A | 6/1982 | Inoue et al. |
| 4,750,167 A | 6/1988 | Meyer |
| 4,870,408 A | 9/1989 | Zdunek et al. |
| 4,881,263 A | 11/1989 | Herbison et al. |
| 4,901,307 A | 2/1990 | Gilhousen et al. |
| RE33,189 E | 3/1990 | Lee et al. |
| 4,924,513 A | 5/1990 | Herbison et al. |
| 5,052,000 A | 9/1991 | Wang et al. |
| 5,056,109 A | 10/1991 | Gilhousen et al. |
| 5,101,501 A | 3/1992 | Gilhousen et al. |
| 5,103,459 A | 4/1992 | Gilhousen et al. |
| 5,117,457 A | 5/1992 | Comerford et al. |
| 5,136,586 A | 8/1992 | Greenblatt |
| 5,150,412 A | 9/1992 | Maru |
| 5,159,447 A | 10/1992 | Haskell et al. |
| 5,164,988 A | 11/1992 | Matyas et al. |
| 5,235,631 A | 8/1993 | Grube et al. |
| 5,237,612 A | 8/1993 | Raith |
| 5,239,584 A | 8/1993 | Hershey et al. |
| 5,241,598 A | 8/1993 | Raith |
| 5,253,294 A | 10/1993 | Maurer |
| 5,257,396 A | 10/1993 | Auld, Jr. et al. |
| 5,325,357 A | 6/1994 | Kimoto et al. |
| 5,351,087 A | 9/1994 | Christopher et al. |
| 5,353,332 A | 10/1994 | Raith et al. |
| 5,363,379 A | 11/1994 | Eckenrode et al. |
| 5,365,572 A | 11/1994 | Saegusa et al. |
| 5,369,784 A | 11/1994 | Nelson |
| 5,371,794 A | 12/1994 | Diffie et al. |
| 5,404,563 A | 4/1995 | Green et al. |
| 5,410,602 A | 4/1995 | Finkelstein et al. |
| 5,412,655 A | 5/1995 | Yamada et al. |
| 5,421,006 A | 5/1995 | Jablon et al. |
| 5,442,626 A | 8/1995 | Wei |
| 5,448,568 A | 9/1995 | Delpuch et al. |
| 5,467,398 A | 11/1995 | Pierce et al. |
| 5,473,609 A | 12/1995 | Chaney |
| 5,473,642 A | 12/1995 | Osawa et al. |
| 5,481,613 A | 1/1996 | Ford et al. |
| 5,485,577 A | 1/1996 | Eyer et al. |
| 5,504,773 A | 4/1996 | Padovani et al. |
| 5,513,245 A | 4/1996 | Mizikovsky et al. |
| 5,515,441 A | 5/1996 | Faucher |
| 5,537,474 A | 7/1996 | Brown et al. |
| 5,565,909 A | 10/1996 | Thibadeau et al. |
| 5,579,393 A | 11/1996 | Conner et al. |
| 5,592,470 A | 1/1997 | Rudrapatna et al. |
| 5,659,556 A | 8/1997 | Denissen et al. |
| 5,673,259 A | 9/1997 | Quick, Jr. |
| 5,686,963 A | 11/1997 | Uz et al. |
| 5,708,961 A | 1/1998 | Hylton et al. |
| 5,729,540 A | 3/1998 | Wegrzyn |
| 5,740,246 A | 4/1998 | Saito |
| 5,748,736 A | 5/1998 | Mittra |
| 5,751,707 A | 5/1998 | Voit et al. |
| 5,751,725 A | 5/1998 | Chen |
| 5,758,068 A | 5/1998 | Brandt et al. |
| 5,758,291 A | 5/1998 | Grube et al. |
| 5,768,276 A | 6/1998 | Diachina et al. |
| 5,774,496 A | 6/1998 | Butler et al. |
| 5,778,059 A | 7/1998 | Loghmani et al. |
| 5,778,069 A | 7/1998 | Thomlinson et al. |
| 5,778,187 A | 7/1998 | Monteiro et al. |
| 5,787,172 A | 7/1998 | Arnold |
| 5,787,347 A | 7/1998 | Yu et al. |
| 5,796,829 A | 8/1998 | Newby et al. |
| 5,835,730 A | 11/1998 | Grossman et al. |
| 5,850,444 A | 12/1998 | Rune |
| 5,850,445 A | 12/1998 | Chan et al. |
| 5,870,474 A | 2/1999 | Wasilewski et al. |
| 5,878,141 A | 3/1999 | Daly et al. |
| 5,881,368 A | 3/1999 | Grob et al. |
| 5,884,196 A | 3/1999 | Lekven et al. |
| 5,887,252 A | 3/1999 | Noneman |
| 5,909,491 A | 6/1999 | Luo |
| 5,915,024 A | 6/1999 | Kitaori et al. |
| 5,923,649 A | 7/1999 | Raith |
| 5,936,965 A | 8/1999 | Doshi et al. |
| 5,940,507 A | 8/1999 | Cane et al. |
| 5,946,316 A | 8/1999 | Chen et al. |
| 5,956,404 A | 9/1999 | Schneier et al. |
| 5,956,681 A | 9/1999 | Yamakita |
| 5,970,072 A | 10/1999 | Gammenthaler et al. |
| 5,970,417 A | 10/1999 | Toyryla et al. |
| 5,978,386 A | 11/1999 | Hamalainen et al. |
| 5,983,099 A | 11/1999 | Yao et al. |
| 5,983,388 A | 11/1999 | Friedman et al. |
| 5,990,928 A | 11/1999 | Sklar et al. |
| 5,991,400 A | 11/1999 | Kamperman |
| 5,991,407 A | 11/1999 | Murto |
| 6,006,073 A | 12/1999 | Glauner et al. |
| 6,014,765 A | 1/2000 | Maeda et al. |
| 6,018,360 A | 1/2000 | Stewart et al. |
| 6,021,124 A | 2/2000 | Haartsen |
| 6,026,165 A | 2/2000 | Marino et al. |
| 6,032,197 A | 2/2000 | Birdwell et al. |
| 6,044,154 A | 3/2000 | Kelly |
| 6,047,071 A | 4/2000 | Shah |
| 6,047,395 A | 4/2000 | Zook |
| 6,052,812 A | 4/2000 | Chen et al. |
| 6,055,236 A | 4/2000 | Nessett et al. |
| 6,055,314 A | 4/2000 | Spies et al. |
| 6,058,289 A | 5/2000 | Gardner et al. |
| 6,065,061 A | 5/2000 | Blahut et al. |
| 6,067,290 A | 5/2000 | Paulraj et al. |
| 6,073,122 A | 6/2000 | Wool |
| 6,081,907 A | 6/2000 | Witty et al. |
| 6,097,817 A | 8/2000 | Bilgic et al. |
| 6,098,878 A | 8/2000 | Dent et al. |
| 6,108,424 A | 8/2000 | Pitiot |
| 6,108,706 A | 8/2000 | Birdwell et al. |
| 6,111,866 A | 8/2000 | Kweon et al. |
| 6,122,763 A | 9/2000 | Pyndiah et al. |
| 6,128,389 A | 10/2000 | Chan et al. |
| 6,128,490 A | 10/2000 | Shaheen et al. |
| 6,128,735 A | 10/2000 | Goldstein et al. |
| 6,148,010 A | 11/2000 | Sutton et al. |
| 6,148,400 A | 11/2000 | Arnold |
| 6,157,719 A | 12/2000 | Wasilewski et al. |
| 6,172,972 B1 | 1/2001 | Birdwell et al. |
| 6,185,430 B1 | 2/2001 | Yee et al. |
| 6,195,546 B1 | 2/2001 | Leung et al. |
| 6,199,161 B1 | 3/2001 | Ahvenainen |
| 6,201,961 B1 | 3/2001 | Schindall et al. |
| 6,208,634 B1 | 3/2001 | Boulos et al. |
| 6,230,024 B1 | 5/2001 | Wang et al. |
| 6,233,234 B1 | 5/2001 | Curry et al. |
| 6,233,341 B1 | 5/2001 | Riggins |
| 6,240,091 B1 | 5/2001 | Ginzboorg et al. |
| 6,253,069 B1 | 6/2001 | Mankovitz |
| 6,253,326 B1 | 6/2001 | Lincke et al. |
| 6,256,509 B1 | 7/2001 | Tanaka et al. |
| 6,266,420 B1 | 7/2001 | Langford et al. |
| 6,272,632 B1 | 8/2001 | Carman et al. |
| 6,295,361 B1 | 9/2001 | Kadansky et al. |
| 6,310,661 B1 | 10/2001 | Arsenault |
| 6,314,095 B1 | 11/2001 | Loa |
| 6,343,280 B2 | 1/2002 | Clark |
| 6,345,307 B1 | 2/2002 | Booth |
| 6,353,614 B1 | 3/2002 | Borella et al. |
| 6,363,242 B1 | 3/2002 | Brown, Jr. et al. |
| 6,363,480 B1 | 3/2002 | Perlman |
| 6,366,776 B1 | 4/2002 | Wright et al. |
| 6,373,829 B1 | 4/2002 | Vilmur |
| 6,374,103 B1 | 4/2002 | Kamel et al. |
| 6,377,810 B1 | 4/2002 | Geiger et al. |
| 6,385,200 B1 | 5/2002 | Erami et al. |
| 6,385,461 B1 | 5/2002 | Raith |

(56) References Cited

U.S. PATENT DOCUMENTS

| | | |
|---|---|---|
| 6,408,001 B1 | 6/2002 | Chuah et al. |
| 6,415,312 B1 | 7/2002 | Boivie |
| 6,424,717 B1 | 7/2002 | Pinder et al. |
| 6,424,947 B1 | 7/2002 | Tsuria et al. |
| 6,434,367 B1 | 8/2002 | Kumar et al. |
| 6,438,612 B1 | 8/2002 | Ylonen et al. |
| 6,449,491 B1 | 9/2002 | Dailey |
| 6,456,716 B1 | 9/2002 | Arnold |
| 6,460,156 B1 | 10/2002 | Laukkanen et al. |
| 6,463,155 B1 | 10/2002 | Akiyama et al. |
| 6,473,419 B1 | 10/2002 | Gray et al. |
| 6,473,858 B1 | 10/2002 | Shimomura et al. |
| 6,477,377 B2 | 11/2002 | Backstrom et al. |
| 6,490,259 B1 | 12/2002 | Agrawal et al. |
| 6,493,761 B1 | 12/2002 | Baker et al. |
| 6,502,140 B1 | 12/2002 | Boivie |
| 6,507,590 B1 | 1/2003 | Terho et al. |
| 6,510,515 B1 | 1/2003 | Raith |
| RE38,007 E | 2/2003 | Tsukamoto et al. |
| 6,519,266 B1 | 2/2003 | Manning et al. |
| 6,523,069 B1 | 2/2003 | Luczycki et al. |
| 6,529,740 B1 | 3/2003 | Ganucheau, Jr. et al. |
| 6,536,041 B1 | 3/2003 | Knudson et al. |
| 6,538,996 B1 | 3/2003 | West et al. |
| 6,539,242 B1 | 3/2003 | Bayley |
| 6,542,490 B1 | 4/2003 | Ahmadvand et al. |
| 6,542,504 B1 | 4/2003 | Mahler et al. |
| 6,549,771 B2 | 4/2003 | Chang et al. |
| 6,560,206 B1 | 5/2003 | Naden et al. |
| 6,564,211 B1 | 5/2003 | Andreev et al. |
| 6,567,914 B1 | 5/2003 | Just et al. |
| 6,571,109 B1 | 5/2003 | Kim |
| 6,574,211 B2 | 6/2003 | Padovani et al. |
| 6,577,734 B1 | 6/2003 | Etzel et al. |
| 6,577,848 B1 | 6/2003 | Gregg et al. |
| 6,580,756 B1 | 6/2003 | Matsui et al. |
| 6,598,203 B1 | 7/2003 | Tang |
| 6,600,745 B1 | 7/2003 | Chopping |
| 6,601,068 B1 | 7/2003 | Park |
| 6,603,857 B1 | 8/2003 | Batten-Carew et al. |
| 6,606,706 B1 | 8/2003 | Li |
| 6,608,841 B1 | 8/2003 | Koodli |
| 6,614,804 B1 | 9/2003 | McFadden et al. |
| 6,633,979 B1 | 10/2003 | Smeets |
| 6,640,094 B1 | 10/2003 | Tabeta |
| 6,647,000 B1 | 11/2003 | Persson et al. |
| 6,654,384 B1 | 11/2003 | Reza et al. |
| 6,658,463 B1 | 12/2003 | Dillon et al. |
| 6,658,605 B1 | 12/2003 | Yoshida et al. |
| 6,665,718 B1 | 12/2003 | Chuah et al. |
| 6,678,856 B1 | 1/2004 | Jordan et al. |
| 6,680,920 B1 | 1/2004 | Wan |
| 6,690,795 B1 | 2/2004 | Richards |
| 6,704,368 B1 | 3/2004 | Nefedov |
| 6,704,369 B1 | 3/2004 | Kawasaki et al. |
| 6,707,801 B2 | 3/2004 | Hsu |
| 6,711,182 B1 | 3/2004 | Gibbs et al. |
| 6,714,650 B1 | 3/2004 | Maillard et al. |
| 6,714,784 B1 | 3/2004 | Forssell et al. |
| 6,721,805 B1 | 4/2004 | Bhagwat et al. |
| 6,725,459 B2 | 4/2004 | Bacon |
| 6,728,226 B1 | 4/2004 | Naito |
| 6,731,936 B2 | 5/2004 | Chen et al. |
| 6,735,177 B1 | 5/2004 | Suzuki |
| 6,735,190 B1 | 5/2004 | Chuah et al. |
| 6,738,942 B1 | 5/2004 | Sridharan et al. |
| 6,751,218 B1 | 6/2004 | Hagirahim et al. |
| 6,760,602 B2 | 7/2004 | Tangorra et al. |
| 6,760,752 B1 | 7/2004 | Liu et al. |
| 6,763,025 B2 | 7/2004 | Leatherbury et al. |
| 6,765,909 B1 | 7/2004 | Sen et al. |
| 6,766,024 B1 | 7/2004 | Rix |
| 6,775,303 B1 | 8/2004 | Rustad et al. |
| 6,781,999 B2 | 8/2004 | Eyuboglu et al. |
| 6,788,681 B1 | 9/2004 | Hurren et al. |
| 6,792,048 B1 | 9/2004 | Lee et al. |
| 6,798,791 B1 | 9/2004 | Riazi et al. |
| 6,801,508 B1 | 10/2004 | Lim |
| 6,804,520 B1 | 10/2004 | Johansson et al. |
| 6,810,499 B2 | 10/2004 | Sridharan et al. |
| 6,819,930 B1 | 11/2004 | Laroia et al. |
| 6,826,406 B1 | 11/2004 | Vialen et al. |
| 6,829,741 B1 | 12/2004 | Khansari et al. |
| 6,831,910 B1 | 12/2004 | Moon et al. |
| 6,832,314 B1 | 12/2004 | Irvin |
| 6,856,800 B1 | 2/2005 | Henry et al. |
| 6,862,684 B1 | 3/2005 | Digiorgio |
| 6,870,923 B2 | 3/2005 | Yi |
| 6,879,573 B1 | 4/2005 | Huo |
| 6,879,690 B2 | 4/2005 | Faccin et al. |
| 6,882,850 B2 | 4/2005 | McConnell et al. |
| 6,882,860 B1 | 4/2005 | Kim |
| 6,885,874 B2 | 4/2005 | Grube et al. |
| 6,888,899 B2 | 5/2005 | Raleigh et al. |
| 6,895,216 B2 | 5/2005 | Sato et al. |
| 6,895,546 B2 | 5/2005 | Ivry |
| 6,898,285 B1 | 5/2005 | Hutchings et al. |
| 6,898,640 B1 | 5/2005 | Kurita et al. |
| 6,909,702 B2 | 6/2005 | Leung et al. |
| 6,915,272 B1 | 7/2005 | Zilliacus et al. |
| 6,918,035 B1 | 7/2005 | Patel |
| 6,920,119 B2 | 7/2005 | Rinchiuso |
| 6,925,285 B2 | 8/2005 | Kim |
| 6,944,763 B1 | 9/2005 | Asano et al. |
| 6,952,454 B1 | 10/2005 | Jalali et al. |
| 6,956,833 B1 | 10/2005 | Yukie et al. |
| 6,959,384 B1 | 10/2005 | Serret-Avila |
| 6,963,544 B1 | 11/2005 | Balachandran et al. |
| 6,970,689 B2 | 11/2005 | Khorram |
| 6,978,143 B1 | 12/2005 | Vialen |
| 6,983,410 B2 | 1/2006 | Chen et al. |
| 6,987,982 B2 | 1/2006 | Willenegger et al. |
| 6,990,680 B1 | 1/2006 | Wugofski |
| 7,016,351 B1 | 3/2006 | Farinacci et al. |
| 7,024,616 B2 | 4/2006 | Ohira et al. |
| 7,031,666 B2 | 4/2006 | Hsu |
| 7,036,023 B2 | 4/2006 | Fries et al. |
| 7,039,180 B1 | 5/2006 | Issaa et al. |
| 7,046,672 B2 | 5/2006 | Liao et al. |
| 7,056,609 B2 | 6/2006 | Reiser et al. |
| 7,069,436 B1 | 6/2006 | Akachi |
| 7,072,865 B2 | 7/2006 | Akiyama |
| 7,079,502 B2 | 7/2006 | Yamano et al. |
| 7,079,523 B2 | 7/2006 | Nelson, Jr. et al. |
| 7,096,355 B1 | 8/2006 | Marvit et al. |
| 7,114,175 B2 | 9/2006 | Lahteenmaki |
| 7,116,892 B2 | 10/2006 | Wajs |
| 7,133,353 B2 | 11/2006 | Sourour et al. |
| 7,134,019 B2 | 11/2006 | Shelest et al. |
| 7,146,130 B2 | 12/2006 | Hsu et al. |
| 7,177,424 B1 | 2/2007 | Furuya et al. |
| 7,181,620 B1 | 2/2007 | Hur |
| 7,184,789 B2 | 2/2007 | Leung et al. |
| 7,185,362 B2 | 2/2007 | Hawkes et al. |
| 7,197,072 B1 | 3/2007 | Hsu et al. |
| 7,200,230 B2 | 4/2007 | Knauft |
| 7,203,314 B1 | 4/2007 | Kahn et al. |
| 7,209,459 B2 | 4/2007 | Kangas |
| 7,215,775 B2 | 5/2007 | Noguchi et al. |
| 7,219,291 B2 | 5/2007 | Adde et al. |
| 7,237,108 B2 | 6/2007 | Medvinsky et al. |
| 7,239,704 B1 | 7/2007 | Maillard et al. |
| 7,266,687 B2 | 9/2007 | Sowa et al. |
| 7,278,164 B2 | 10/2007 | Raiz et al. |
| 7,280,660 B2 | 10/2007 | Salo et al. |
| 7,290,063 B2 | 10/2007 | Kalliokulju et al. |
| 7,301,946 B2 | 11/2007 | Meier et al. |
| 7,301,968 B2 | 11/2007 | Haran et al. |
| 7,308,100 B2 | 12/2007 | Bender et al. |
| 7,321,968 B1 | 1/2008 | Capellaro et al. |
| 7,349,425 B2 | 3/2008 | Leung et al. |
| 7,352,868 B2 | 4/2008 | Hawkes et al. |
| 7,376,963 B2 | 5/2008 | Kato et al. |
| 7,391,866 B2 | 6/2008 | Fukami et al. |

(56) References Cited

U.S. PATENT DOCUMENTS

| | | |
|---|---|---|
| 7,428,512 B2 | 9/2008 | Nozaki et al. |
| 7,599,655 B2 | 10/2009 | Agashe et al. |
| 7,649,829 B2 | 1/2010 | Chen et al. |
| 7,669,104 B2 | 2/2010 | Uchida et al. |
| 7,693,508 B2 | 4/2010 | Leung et al. |
| 7,697,523 B2 | 4/2010 | Leung et al. |
| 7,742,781 B2 | 6/2010 | Chen et al. |
| 7,792,074 B2 | 9/2010 | Chen et al. |
| 7,944,925 B2 | 5/2011 | Meier et al. |
| 8,077,679 B2 | 12/2011 | Leung |
| 8,098,818 B2 | 1/2012 | Grilli et al. |
| 8,121,296 B2 | 2/2012 | Hawkes et al. |
| 8,713,400 B2 | 4/2014 | Chen et al. |
| 2001/0004761 A1 | 6/2001 | Zehavi |
| 2001/0034254 A1 | 10/2001 | Ranta et al. |
| 2001/0036200 A1 | 11/2001 | Nelson et al. |
| 2001/0036834 A1 | 11/2001 | Das et al. |
| 2001/0055298 A1 | 12/2001 | Baker et al. |
| 2002/0002541 A1 | 1/2002 | Williams |
| 2002/0002674 A1 | 1/2002 | Grimes et al. |
| 2002/0010681 A1 | 1/2002 | Hillegass et al. |
| 2002/0014159 A1 | 2/2002 | Tatsumi et al. |
| 2002/0023165 A1 | 2/2002 | Lahr |
| 2002/0071558 A1 | 6/2002 | Patel |
| 2002/0076195 A1 | 6/2002 | Nakajima et al. |
| 2002/0080887 A1 | 6/2002 | Jeong et al. |
| 2002/0091931 A1 | 7/2002 | Quick, Jr. et al. |
| 2002/0102964 A1 | 8/2002 | Park |
| 2002/0114469 A1 | 8/2002 | Faccin et al. |
| 2002/0141371 A1 | 10/2002 | Hsu |
| 2002/0141591 A1 | 10/2002 | Hawkes et al. |
| 2002/0169724 A1 | 11/2002 | Moroney et al. |
| 2002/0181423 A1 | 12/2002 | Chen et al. |
| 2003/0014685 A1 | 1/2003 | Chong et al. |
| 2003/0018891 A1 | 1/2003 | Hall et al. |
| 2003/0028805 A1 | 2/2003 | Lahteenmaki |
| 2003/0030581 A1 | 2/2003 | Roy |
| 2003/0031322 A1 | 2/2003 | Beckmann et al. |
| 2003/0035389 A1 | 2/2003 | Chen et al. |
| 2003/0039237 A1 | 2/2003 | Forslow |
| 2003/0054807 A1 | 3/2003 | Hsu et al. |
| 2003/0072384 A1 | 4/2003 | Chen et al. |
| 2003/0087653 A1 | 5/2003 | Leung et al. |
| 2003/0101401 A1 | 5/2003 | Salvi et al. |
| 2003/0123669 A1 | 7/2003 | Koukoulidis et al. |
| 2003/0126440 A1 | 7/2003 | Go et al. |
| 2003/0134655 A1 | 7/2003 | Chen et al. |
| 2003/0135748 A1 | 7/2003 | Yamada et al. |
| 2003/0157952 A1 | 8/2003 | Sarkkinen et al. |
| 2003/0159029 A1 | 8/2003 | Brown et al. |
| 2003/0217057 A1 | 11/2003 | Kuroiwa et al. |
| 2004/0019787 A1 | 1/2004 | Shibata |
| 2004/0022216 A1 | 2/2004 | Shi |
| 2004/0095515 A1 | 5/2004 | Tajima |
| 2004/0101138 A1 | 5/2004 | Revital et al. |
| 2004/0107350 A1 | 6/2004 | Wasilewski et al. |
| 2004/0120527 A1 | 6/2004 | Hawkes et al. |
| 2004/0131185 A1 | 7/2004 | Kakumer |
| 2004/0132402 A1 | 7/2004 | Agashe et al. |
| 2004/0151317 A1 | 8/2004 | Hyyppa et al. |
| 2004/0199474 A1 | 10/2004 | Ritter |
| 2004/0202329 A1 | 10/2004 | Jung et al. |
| 2004/0243808 A1 | 12/2004 | Ishiguro et al. |
| 2004/0266391 A1 | 12/2004 | Hafren |
| 2005/0008159 A1 | 1/2005 | Grilli et al. |
| 2005/0010774 A1 | 1/2005 | Rose et al. |
| 2005/0048963 A1 | 3/2005 | Kubler et al. |
| 2005/0055551 A1 | 3/2005 | Becker et al. |
| 2005/0063544 A1 | 3/2005 | Uusitalo et al. |
| 2005/0108563 A1 | 5/2005 | Becker et al. |
| 2005/0138379 A1 | 6/2005 | Semple et al. |
| 2005/0144550 A1 | 6/2005 | Jeon et al. |
| 2005/0165711 A1 | 7/2005 | Hamatsu |
| 2005/0216731 A1 | 9/2005 | Saito et al. |
| 2005/0238315 A1 | 10/2005 | Kataoka |
| 2005/0271210 A1 | 12/2005 | Soppera |
| 2006/0078000 A1 | 4/2006 | Rinne et al. |
| 2006/0168446 A1 | 7/2006 | Ahonen et al. |
| 2006/0171540 A1 | 8/2006 | Lee et al. |
| 2006/0242412 A1 | 10/2006 | Jung et al. |
| 2007/0038610 A1 | 2/2007 | Omoigui |
| 2007/0116282 A1 | 5/2007 | Hawkes et al. |
| 2007/0214482 A1 | 9/2007 | Nguyen |
| 2007/0280169 A1 | 12/2007 | Cam Winget |
| 2008/0226073 A1 | 9/2008 | Hawkes et al. |
| 2010/0107041 A1 | 4/2010 | Chen et al. |
| 2010/0142432 A1 | 6/2010 | Leung et al. |
| 2010/0272124 A1 | 10/2010 | Chen et al. |
| 2011/0045864 A1 | 2/2011 | Chen et al. |

FOREIGN PATENT DOCUMENTS

| | | |
|---|---|---|
| CN | 1256599 A | 6/2000 |
| CN | 1281561 A | 1/2001 |
| CN | 1299497 A | 6/2001 |
| EP | 0636963 A2 | 2/1995 |
| EP | 0702477 A2 | 3/1996 |
| EP | 0717566 A1 | 6/1996 |
| EP | 0748058 A2 | 12/1996 |
| EP | 0813309 A2 | 12/1997 |
| EP | 0854618 A2 | 7/1998 |
| EP | 0924898 A1 | 6/1999 |
| EP | 0928084 | 7/1999 |
| EP | 0951198 A2 | 10/1999 |
| EP | 0993128 A1 | 4/2000 |
| EP | 0999656 A1 | 5/2000 |
| EP | 1001570 A2 | 5/2000 |
| EP | 1024661 A2 | 8/2000 |
| EP | 1030484 A2 | 8/2000 |
| EP | 1032150 A2 | 8/2000 |
| EP | 1071296 A1 | 1/2001 |
| EP | 1075118 A2 | 2/2001 |
| EP | 1075123 A1 | 2/2001 |
| EP | 1098446 A2 | 5/2001 |
| EP | 1117204 A2 | 7/2001 |
| EP | 1134951 A2 | 9/2001 |
| EP | 1143635 A1 | 10/2001 |
| EP | 1185125 | 3/2002 |
| EP | 1190526 A1 | 3/2002 |
| EP | 1213943 A1 | 6/2002 |
| EP | 1248188 A1 | 10/2002 |
| EP | 1374477 A1 | 10/2002 |
| EP | 2204940 | 7/2010 |
| GB | 2346512 | 8/2000 |
| JP | 1101042 | 4/1989 |
| JP | 02090840 | 3/1990 |
| JP | 03179841 | 5/1991 |
| JP | 5216411 A | 8/1993 |
| JP | 06125554 | 5/1994 |
| JP | 7115414 | 5/1995 |
| JP | 7193569 | 7/1995 |
| JP | 7288798 | 10/1995 |
| JP | 9135478 A | 5/1997 |
| JP | 9331314 A | 12/1997 |
| JP | 10023529 A | 1/1998 |
| JP | 10051380 A | 2/1998 |
| JP | 10063598 A | 3/1998 |
| JP | 10093547 | 4/1998 |
| JP | 10093547 A | 4/1998 |
| JP | 10191459 | 7/1998 |
| JP | 10200535 A | 7/1998 |
| JP | 10214233 | 8/1998 |
| JP | H10210029 A | 8/1998 |
| JP | 10240826 | 11/1998 |
| JP | 10512428 | 11/1998 |
| JP | 11110401 A | 4/1999 |
| JP | 11127468 | 5/1999 |
| JP | 11136669 A | 5/1999 |
| JP | 11161167 | 6/1999 |
| JP | 11243569 A | 9/1999 |
| JP | 11510668 T | 9/1999 |
| JP | 1131070 A | 11/1999 |
| JP | 11313059 A | 11/1999 |
| JP | 11331150 A | 11/1999 |

(56) References Cited

FOREIGN PATENT DOCUMENTS

| | | |
|---|---|---|
| JP | 11513853 | 11/1999 |
| JP | 11345179 A | 12/1999 |
| JP | 11355460 A | 12/1999 |
| JP | 11355858 A | 12/1999 |
| JP | 2000040064 A | 2/2000 |
| JP | 2000078555 A | 3/2000 |
| JP | 2000115860 | 4/2000 |
| JP | 2000134193 | 5/2000 |
| JP | 2000137551 A | 5/2000 |
| JP | 2000138632 A | 5/2000 |
| JP | 200165258 A | 6/2000 |
| JP | 2000183968 A | 6/2000 |
| JP | 200196673 A | 7/2000 |
| JP | 2000196546 A | 7/2000 |
| JP | 2000224261 A | 8/2000 |
| JP | 2000224648 A | 8/2000 |
| JP | 2000244603 | 9/2000 |
| JP | 2000253065 A | 9/2000 |
| JP | 2000253459 A | 9/2000 |
| JP | 2000261374 A | 9/2000 |
| JP | 2000269959 | 9/2000 |
| JP | 2000511733 T | 9/2000 |
| JP | 000513519 | 10/2000 |
| JP | 2000287192 | 10/2000 |
| JP | 2000295541 | 10/2000 |
| JP | 2000324155 A | 11/2000 |
| JP | 2000349755 A | 12/2000 |
| JP | 2001007759 A | 1/2001 |
| JP | 2001007800 | 1/2001 |
| JP | 2001016179 A | 1/2001 |
| JP | 2001016253 A | 1/2001 |
| JP | 2001500327 | 1/2001 |
| JP | 200136941 | 2/2001 |
| JP | 2001036466 A | 2/2001 |
| JP | 2001045100 A | 2/2001 |
| JP | 2001053675 A | 2/2001 |
| JP | 2001077859 A | 3/2001 |
| JP | 2001119340 A | 4/2001 |
| JP | 2001134193 | 5/2001 |
| JP | 2001136507 A | 5/2001 |
| JP | 2001177513 A | 6/2001 |
| JP | 2001177523 A | 6/2001 |
| JP | 2001177564 A | 6/2001 |
| JP | 2001510970 | 8/2001 |
| JP | 2001512842 | 8/2001 |
| JP | 2001268535 A | 9/2001 |
| JP | 2001513587 | 9/2001 |
| JP | 2001333032 A | 11/2001 |
| JP | 2001522164 T | 11/2001 |
| JP | 2002026835 | 1/2002 |
| JP | 2002027417 | 1/2002 |
| JP | 2002502204 A | 1/2002 |
| JP | 2002064785 A | 2/2002 |
| JP | 2002505458 T | 2/2002 |
| JP | 2002506296 | 2/2002 |
| JP | 2002084470 A | 3/2002 |
| JP | 2002152194 | 5/2002 |
| JP | 2002514024 | 5/2002 |
| JP | 2002175505 | 6/2002 |
| JP | 2002521879 T | 7/2002 |
| JP | 2002216040 | 8/2002 |
| JP | 2002217894 | 8/2002 |
| JP | 2002232418 A | 8/2002 |
| JP | 2002232962 | 8/2002 |
| JP | 2002524941 A | 8/2002 |
| JP | 2002300152 | 10/2002 |
| JP | 2002319936 | 10/2002 |
| JP | 2002353951 A | 12/2002 |
| JP | 2002541685 | 12/2002 |
| JP | 2003503896 | 1/2003 |
| JP | 200352029 | 2/2003 |
| JP | 200309932 A | 4/2003 |
| JP | 2003115832 | 4/2003 |
| JP | 2003521843 T | 7/2003 |
| JP | 2003259284 A | 9/2003 |
| JP | 2003297015 A | 10/2003 |
| JP | 2003529963 | 10/2003 |
| JP | 2003339000 A | 11/2003 |
| JP | 2004048718 A | 2/2004 |
| JP | 200480663 | 3/2004 |
| JP | 2004507175 A | 3/2004 |
| JP | 2004532554 | 10/2004 |
| JP | 2004533174 | 10/2004 |
| JP | 2004343764 | 12/2004 |
| JP | 2005509367 | 4/2005 |
| JP | 2005512471 | 4/2005 |
| KR | 20000062153 | 10/2000 |
| KR | 200130725 | 4/2001 |
| KR | 20010030696 | 4/2001 |
| RU | 2073913 C1 | 2/1997 |
| RU | 2077113 C1 | 4/1997 |
| RU | 2091983 C1 | 9/1997 |
| RU | 2115249 C1 | 7/1998 |
| RU | 214779 C1 | 4/2000 |
| RU | 2187205 | 8/2002 |
| TW | 353841 | 3/1999 |
| TW | 373372 | 11/1999 |
| TW | 388158 | 4/2000 |
| TW | 420910 B | 2/2001 |
| TW | 448658 | 8/2001 |
| TW | 502190 | 9/2002 |
| TW | 508958 B | 11/2002 |
| WO | 8301881 A1 | 5/1983 |
| WO | WO8607224 A1 | 12/1986 |
| WO | WO9611538 A2 | 4/1996 |
| WO | WO97015161 A1 | 4/1997 |
| WO | 9716924 A1 | 5/1997 |
| WO | WO9716890 A2 | 5/1997 |
| WO | WO9717790 A1 | 5/1997 |
| WO | WO9748212 A1 | 12/1997 |
| WO | WO97047094 | 12/1997 |
| WO | WO9810604 A1 | 3/1998 |
| WO | WO9825422 A1 | 6/1998 |
| WO | WO9857509 A2 | 12/1998 |
| WO | WO9904583 A1 | 1/1999 |
| WO | WO9922466 A1 | 5/1999 |
| WO | WO9922478 A1 | 5/1999 |
| WO | WO9930234 A1 | 6/1999 |
| WO | WO99039524 | 8/1999 |
| WO | WO9944114 A1 | 9/1999 |
| WO | WO9949595 A1 | 9/1999 |
| WO | WO99049588 | 9/1999 |
| WO | WO9959355 A2 | 11/1999 |
| WO | WO9962231 A1 | 12/1999 |
| WO | WO9966657 A1 | 12/1999 |
| WO | WO0002406 A2 | 1/2000 |
| WO | WO0004718 A1 | 1/2000 |
| WO | 0008883 | 2/2000 |
| WO | WO0013356 A1 | 3/2000 |
| WO | WO-0013436 A2 | 3/2000 |
| WO | WO0033535 A1 | 6/2000 |
| WO | WO0036804 A1 | 6/2000 |
| WO | WO 0041364 A1 | 7/2000 |
| WO | WO0048358 | 8/2000 |
| WO | WO0051308 A2 | 8/2000 |
| WO | WO0052880 A2 | 9/2000 |
| WO | WO0056018 A1 | 9/2000 |
| WO | WO0057601 A1 | 9/2000 |
| WO | WO0062476 | 10/2000 |
| WO | WO0062547 A1 | 10/2000 |
| WO | WO0072609 A1 | 11/2000 |
| WO | WO0074311 | 12/2000 |
| WO | WO 0074425 A1 | 12/2000 |
| WO | WO0076125 A1 | 12/2000 |
| WO | WO0076234 A1 | 12/2000 |
| WO | WO0078008 A1 | 12/2000 |
| WO | WO0079734 A1 | 12/2000 |
| WO | WO0101630 A1 | 1/2001 |
| WO | WO0110146 A1 | 2/2001 |
| WO | WO0113358 | 2/2001 |
| WO | WO0117163 | 3/2001 |
| WO | WO0119027 A2 | 3/2001 |
| WO | WO0120805 | 3/2001 |
| WO | WO0145443 | 6/2001 |

(56) References Cited

FOREIGN PATENT DOCUMENTS

| WO | WO0150783 | 7/2001 |
|---|---|---|
| WO | WO0156232 | 8/2001 |
| WO | WO0208449 | 1/2002 |
| WO | 0215578 A1 | 2/2002 |
| WO | 0247407 | 6/2002 |
| WO | WO0247356 | 6/2002 |
| WO | WO02061572 A1 | 6/2002 |
| WO | WO02054663 A2 | 7/2002 |
| WO | WO02080449 A1 | 10/2002 |
| WO | WO02080454 A2 | 10/2002 |
| WO | WO02096150 | 11/2002 |
| WO | WO03001772 | 3/2003 |
| WO | WO03032573 A2 | 4/2003 |
| WO | 03043310 A1 | 5/2003 |
| WO | 03051056 A1 | 6/2003 |
| WO | WO03051072 | 6/2003 |
| WO | 03063418 | 7/2003 |
| WO | WO2004025895 A1 | 3/2004 |
| WO | WO2005008393 | 1/2005 |
| WO | WO2009130589 A1 | 10/2009 |

OTHER PUBLICATIONS

International Preliminary Examination Report—PCT/US03/041311, IPEA/US, May 17, 2006.
ETSI: "Universal Mobile Telecommunications System (UMTS) ; Multimedia Broadcast/Multicast Service (MBMS) ; Stage 1, 3GPP TS 22.146 Version 5.2.0 Release 5", ETSI TS 22.146 v5.2.0, pp. 1-15, Mar. 2002.
ETSI: "Universal Mobile Telecommunications System (UMTS) ; Radio Interference for Broadcast/Multicast Services (3GPP TR25. 925 Version 3.30 Release 1999)", ETSI TR 125 925 v3.30 p. 1-35, Dec. 2000.
3GPP TS 25.214 v4.1.0(Jun. 2001) Universal Mobile Telecommunications System (UMTS); Physical layer procedurees (FDD), Release 4, ETSI TS 125 214 V4.1.0, Jun. 2001.
Alfred J. Menezes, Paul C. van Oorschot and Scott A. Vanstone. Handbook of Applied Cryptography, CRC Press. (Oct. 1996) p. 364 (in particular, refer to section 9.6.3), http://www.cacr.math.uwaterloo.ca/hac/about/chap9.pdf.
Baugher et al.: "The Secure Real Time Transport Protocol" Internet Engineering Task Force, AVT Working Froup, Internet -Draft, Jul. 2003, XP002320685.
Brown, D., "Techniques for Privacy and Authentication in Personal Communication Systems," IEEE Personal Communications, vol. 2, No. 4, pp. 6-10, Aug. 1995, doi: 10.1109/98.403452.
European Search Report—EP10004607, Search Authority—Munich Patent Office, Nov. 18, 2010.
European Search Report—EP10005810, Search Authority—Munich Patent Office, Nov. 10, 2010.
Haverinen, et al., "EAP SIM Authentication"draft-haver inen-pppext-eap-sim-11 .txt, [online] <URL:http://www.watersprings.orglpub.id/draft-haverinen~pppext-easp-sim- 11 .txt> Jun. 2003, pp. 1-64.
Haverinen H: "EAP SIM Authentication", 3DPP Draft; S3-010663_Draft-Haverinen-pppext-EAP-SIM-0 2, 3rd Generation Partnership-Project (3GPP), Mobile Competence Centre; 650, Route Des Lucioles ; F-06921Sophia-Antipolis Cedex; France, vol. SA WG3, no. Sophia; 20011128, Nov. 28, 2001, XP050271835, [retrieved on Nov. 28, 2001].
JNSA, Trend of the Lastest Security Protocol "IPsecH-with Demonstration Experiment Report for Interconnection," Network Magazine, vol. 6, No. 6, Japan, Jun. 2001, vol. 6, pp. 86-93.
Meier J D et al: "Building Secure ASP.NET Applications: Authentication, Authorization, and Secure Communication: Cryptography and Certificates" Microsoft Patterns & Practices, Nov. 2002, pp. 1-5, XP002321827.
Okamoto, "Encrytion Technology for Realizing a Bright Information Society 5: Management of Encrytion Key Distribution", Bit Japan, Kyoritsu Shuppan Co., Ltd., Nov. 1, 1991, vol. 23, pp. 51-59.
Pannetrat, et al, "Authenticating real time packet streams and multicast", 2002 IEEE. Computers and Communications, 2002. Proceedings. ISCC 2002. Seventh International Symposium on, pp. 490-495.
Pelletier, et al., "Robust Header Compression (ROHC): A Profile for TCP/IP (ROHC-TCP)", Internet Draft, Feb. 21, 2005, pp. 1-2.
Stallings, W.: "Cryptography and networks security: Principles and Practice" Second Edition, 1999, Prentice Hall, New Jersey, pp. 400-413.
Supplementary European Search Report—EP04777745, Search Authority—Berlin Patent Office, Dec. 14, 2010.
Taiwanese Search report—093124861—TIPO—Dec. 7, 2010.
Translation of Office Action in Japan Application 2004-531597 corresponding to U.S. Appl. No. 11/626,822, citing JP2002506296, JP2002026835, JP2002152194, JP2000287192, JP20017800, WO0062476, JP115414, JP7288798, JP10214233, JP11510668, JP2000134193, JP2001131193, JP2001512842, JP2001513587, JP2002027417, JP2002521879, JP2002505458, JP2002232418, WO020612572 and JP2003529963 dated Nov. 24, 2011.
Translation of Office Action in Japan application 2006-518894 corresponding to U.S. Appl. No. 10/870,303, citing JP2002541685, WO0208449, WO2005008393, Dan_Brown_Techniques_pgs_6_10_year_1995 and Haverinen_EAP_SIM_year_2003 dated Mar. 22, 2011.
Translation of Office Action in Japan Application 2002-577339 corresponding to U.S. Appl. No. 09/933,971, citing JP11331070, JP2090840, JP2000244603 and JP2000115860 dated Oct. 19, 2010.
Translation of Office Actionin Japan Application 2008-184930 corresponding to U.S. Appl. No. 12/703,099, citing JP2001177564, JP10200536, T. Asaka et al., T. Miyazaki et al., WO0156232 and WO0150783 dated Feb. 8, 2011.
"Functional Model of a Conditional Access System", EBU Review~Technical European Broadcasting Union, Bussels, BE, No. 266; Dec. 21, 1995: pp. 64-77; XP000559450.
"TIA/EIA/IS-95-B Mobile Station-Base Station Compatibility Standard for Dual-Mode Wideband Spread Spectrum Cellular System." (IS-95 Standard).
3G TS 25.213 V4.1.0 (Jun. 2001) 3rd Generation Partnership Project; Technical Specification Group Radio Access Network; Spreading and Modulation (FDD)(Release 4).
3GPP TS 25.211 V4.2.0 (Sep. 2001) 3rd Generation Partnership Project; Technical Specification Group Radio Access Network; Physical Channels and Mapping of Transport Channels Onto Physical Channels (FDD)(Release 4).
3GPP TS 25.212 V4.2.0 (Sep. 2001) 3rd Generation Partnership Project; Technical Specification Group Radio Access Network; Multiplexing and Channel Coding (FDD)(Release 4).
3GPP TS 25.214 V4.2.0 (Sep. 2001) 3rd Generation Partnership Project; Technical Specification Group Radio Access Network; Physical layer Procedures (FDD)(Release 4).
3GPP2 C.S0002-0 Version 1.0 (Jul. 1999) 3rd Generation Partnership Project 2 "3GPP2" Physical Layer Standard for cdma2000 Spread Spectrum Systems.
Al-Tawil, "A New Authentication Protocol for Roaming Users in GSM", Proceedings for IEEE International Symposium on Computers and Communication, Jul. 6, 1999, pp. 93-99.
B.G. Marchent et al., "Intelligent Control of Mobile Multimedia Systems" Vehicular Technology Conference 1998. VTC 98, 48th IEEE Ottawa, Canada, May 18-21, 1998; New York, USA, May 18, 1998, pp. 2047-2051.
Baccelli, F. et al: "Self Organizing Hierarchical Multicast Trees and Their Optimization," INFOCOM 1999. IEEE, 1081-1089 (Mar. 21, 1999).
Berkovits, S. "How to Broadcast a Secret" Advances in Cryptology, Eurocrypt, International Conference on the Theory and Application of Cryptographic Techniques, Springer-Verlag, Delaware, Apr. 11, 1991, pp. 535-541.
Bormann, C., et al. "Robust Header Compression (ROHC)" Internet Draft, Dec. 2000, pp. 1-122, XP002901751 (pp. 4-5).
Bormann, et al. "Robust Header Compression (ROHC)" Internet Engineering Task Force IETF Draft, 1-145, Feb. 26, 2001.

(56) References Cited

OTHER PUBLICATIONS

Brown: "The Electronic Post It Note Model for Mobile Computing Applications," Computing Lab, The University, Canterbury, Kent, The Institution of Electrical Engineers, IEEE, Savoy Place, London, WC2R OBL, UK.
Estrin, et al., "The Protocol Independent Multicast-Sparse Mode (PIM-SM)," RFC 2362, Jun. 1998.
Farinacci, D., et al., "Generic Routing Encapsulation (GRE)." Network Working Group Request for Comments 2784, Mar. 1-8, 2000. URL:http://www.globecom.net/ieft/rfc/rfc2784.html (retrieved on Feb. 14, 2003).
FOLDOC, "Spread-spectrum communications", definition, dated Aug. 8, 2001, from http://foldoc.org/index.cgi?query=spread+spectrum.
Gong, L. et al: "Trade-offs in Routing Private multicast Traffic," Global Telecommunications Conference, 1995, IEEE, 2124-2128 (Nov. 13, 1995).
Greg Rose et al., "The Secure Real Time Transport Protocol," Internet Draft, Feb. 2001, pp. 1-26.
Handley, M. et al., "SDP; Session Description Protocol" Network Working Group, Request for Comments: 2327, Category: Standards Track, ISI/LBNL, Apr. 1998, pp. 1-42.
IEEE. "IEEE STD. 802.11, Part 11; Wireless LAN Medium Access Control (MAC) and Physical Layer (PHY) Specifications" 1997, pp. 60-70.
Jalali, A., et al. "Data Throughput of CDMA-HDR a High Efficiency-High Data Rate Personal Communication Wireless System," 2000 IEEE, pp. 1854-1858.
Jou, Y, "Developments in Third Generation (3G) CDMA Technology," 2000 IEEE, pp. 460-464.
Kalliokulju J.; "User Plane Architecture of 3rd Generation Mobile Telecommunication Network," IEEE International Conference on Networks, ICON, Proceedings on Networks (ICON'99), Sep. 28, 1999-Oct. 1, 1999, pp. 270-278.
Keeler, Robert E., "Interoperability Considerations for Digital HDTV," IEEE Transactions on Broadcasting, vol. 37, No. 4, Dec. 1991, pp. 128-130.
Lin, et al: "A Multicast Routing Protocol for Multihop Wireless Networks," Dept of Computer Science and Information Engineering, Chung Cheng University, Taiwan, Global Telecommunications Conference, XP010373304.
Linuxguruz: "Free On-Line Dictionary of Computing", §Internet Protocol, Dec. 2000.
Lou et al., "Progressive Video Streaming Over 2G and 3G Wireless System," Proceedings of the 11th IEEE Intl Symposium on Personal Indoor and mobile Radio Communications, vol. 2, Sep. 18-21, 2000, London, pp. 1550-1554.
Macq. Benoit M. et al. "Cryptology for Digital TV Broadcasting", 1995 IEEE.
Marchent, B.G., et al. "Intelligent Control of Mobile Multimedia Systems"Vehicular Technology Conference 1998. VTC 98, 48th IEEE Ottawa, Canada, May 18-21, 1998; New York, USA, May 18, 1998, pp. 2047-2051.
Menezes et al,: "Key Layering and Crypto periods," Passage, Handbook of Applied Cryptography, CRC Press Series on Discrete mathematics and its Applications, BOCA Raton, Fl, CRC Press, US, 1997, pp. 551-553, 557-581.
Menezes, A. et al.: "Handbook of Applied Cryptography" 1997, CRC Press LIC, USA XP002246262 pp. 497-500, 551-552.
Menezes, A. et al.: "Handbook of Applied Cryptography," Chapter 13, pp. 543-590, CRC Press (1996).
Miyazaki: "A Stream-data Multicast Protocol Using IP Unicast Address" Technical Report of IEICE, IN2001-9, May 11, 2001.
Mooij. W.: "Advances in Conditional Access Technology", IEEE, pp. 461-464 (Sep. 1997).
Moy, "Multicast Extensions to OSPF," RFC 1584, Mar. 1994.
Paul K. et al: "A Stability-Based Distributed Routing Mechanism to Support Unicast and Multicast Routing in AD HOC Wireless Network" Computer Communications, Elsevier Science Publishers BV, Amsterdam, NL, vol. 24, No. 18, Dec. 1, 2001, pp. 1828-1845.
Schneier, B.: "Applied Cryptography, Conference Key Distribution and Secret Broadcasting" Second Edition, pp. 520, 523-524, John Wiley & Sons, Inc. XP002248263 (1996).
Schneier. B.: "Applied Cryptography," 2nd Ed, pp. 170, 171, 173, John Wiley & Sons, Inc. (1996).
Schneier. B.: "Applied Cryptography," 2nd Ed, pp. 182-184, John Wiley & Sons, Inc. (1996).
Shannon, C.E., "A Mathematical Theory of Communication," The Bell System Technical Journal, vol. 27, pp. 379-423, 623-656, Jul. Oct. 1948.
Simpson, W., "PPP in HDLC-Like Framing," Network Working Group, Request for Comments: 1662 (RFC 1662), Jul. 1994. pp. 1-17.
Stallings, W.: "Cryptography and network security" 1995, Prentice-Hall, Inc., XP002248261 pp. 402-406, 413-417, 421-424.
Takahashi: "Prospect of Push type Information Providing Service/ Technology," Information Processing, vol. 39, No. 11, Nov. 15, 1998, p. 1124-1131.
Tanenbaum, Andrew S.: Computer Network, Third Edition; Pub. 1996: 179-190.
Tanenbaum, Andrew S.: Computer Network, Second Edition; PUB 1993 XP2530414.
TIA/EIA/IS-856 Interim Standard cdma2000 High Rate Packet Data Air Interface Specification (Nov. 2000).
TIA/EIA/IS-95-A (Revision of TIA/EIA/IS-95) Mobile Station-Base Station Compatibility Standard for Dual-Mode Wideband Spread Spectrum Cellular System (May 1995).
Toh C-K et al: "ABAM: On-Demand Associativity-Based Multicast Routing for AD HOC Mobile Networks," Vehicular Technology Conference, 2000. IEEE, 987-993 (2000).
Waitzman, et al., "The Distance Vector Multicat Routing Protocol (DVMRP)," RFC 1075, Nov. 1, 1998.
Yamaguchi, S., "Realization of Multimedia Communications", Unix Magazine, ASCII Corporation, Jun. 1, 1996, vol. 11, No. 6, pp. 45-53.
Yang et al: "An Efficient Multicast Delievery Scheme to Support Mobile IP," Database and Expert Systems Applications, 1999. IEEE, 638-68 (Sep. 1, 1999).
You Xiaohu, "D&R Progress on China's 3G mobile Communications", Telecom Science, vol. 2, 2001, pp. 11-17.
Asaka et al., "Dynamic Multicast Routing Using Predetermined Path Search", Technical Report of IEICE (The Institute of Electronics, Information and Communication Engineers). SSE95-56 IN99-37 CS99-76, Sep. 27, 1999.
Tadaumi, "IP Technology as Communication Infa," The Institute of Electronics Information and Communication Engineers, col. 83, No. 4, Apr. 2000, pp. 286-294.
Bauer D., et al., "An error-control scheme for a multicast protocol based on round-trip time calculations", Local Computer Networks, 1996., Proceedings 21ST IEEE Conference on Minneapolis, MN, USA Oct. 13-16, 1996, Los Alamitos, CA, USA, IEEE Comput. Soc, US, Oct. 13, 1996, pp. 212-221, XP010200690, DOI: 10.1109/LCN. 1996.558149 ISBN: 978-0-8186-7617-8 * chapters 3 + 3.1 *.
"Feature Story I: Evolution of Cellular Phones," ASCII, Dec. 1, 2000, vol. 24, No. 12, pp. 204.
Menezes Alfred J., et al.,"Handbook of Applied Cryptography," 1997 CRC Press, pp. 169-190.
Mysore J. P., et al., Performance of transport protocols over a multicasting-based architecture for Internet host mobility, Communications, 1998. ICC 98. Conference Record. 1998 IEEE International Conference on Atlanta, GA, USA Jun. 7-11, 1998, New York, NY, USA, IEEE, US, vol. 3, Jun. 7, 1998, pp. 1817-1823, P010284635, DOI: 10.1109/ICC. 1998.683142 ISBN: 978-07803-4788-5 * abstract * chapter 2 * *.
Ohnishi H., et al., "Proposed Scheme for Route Optimization on the Mobile IP Network," Technical Report of the Institute of Electronics, Information and Communication Engineers, SSE99-123 PS99-47, Dec. 17, 1999.
Taiwan Search Report—TW093120386—TIPO—Feb. 8, 2012.
Yajnik M., et al., "Packet loss correlation in the MBone multicast network", Global Telecommunications Conference, 1996. GLOBECOM '96. 'Communications: The Key to Global Prosperity London, UK Nov. 18-22, 1996, New York, NY, USA, IEEE, US, Nov.

(56) References Cited

OTHER PUBLICATIONS 18, 1996, pp. 94-99, XP010220159, DOI: 10.1109/GLOCOM. 1996. 586133 ISBN: 978-0/7803-3336-9 * chapter 3.1 *.

3GPP2 C.R1001-A, "Administration of Parameter Value Assignments for cdma2000 Spread Spectrum Standards Release C" Jul. 14, 2000, Version 2.0.

Chen T., et al.,"cdma2000 Broadcast Services Stage 2: System Design", C10-20010820-008, 3GPP2, Aug. 20, 2001.

Qualcomm Europe: "MBMS Security Framework", 3GPP TSG SA WG3 Security—S3 #29 S3-030356, Jul. 2003, MBMS Security and 3GPP-3GPP2 joint meeting.

Romkey J., "A Nonstandard for Transmission of IP Datagrams Over Serial Lines: Slip", rfc1055, IETF, Jun. 1988, URL, http://www.ietf.org/rfc/rfc1055.txt.

Sinnarajah R., "Signaling Support for Broadcast Service", 3GPP2 TSG-C Contribution, 2002, C20-20020107-022, URL http://ftp.3gpp2.org/TSGC/Working/2002/TSG-C-0201/TSG-C-0201-Vancouver/WG2/C20-20020107-020 (Signaling-Support-for-Broadcast-Service).doc.

Momona, M., et al., "Technologies and Standardization Activities in Cable TV Access Networks," IEICE Technical Report, Japan. The Institute of Electronics, Information and Communication Engineers (IEICE), Feb. 15, 1999. vol. 98, No. 589: pp. 57-64.

Haverinen, H., "GSM SIM Authentication and Key Generation for Mobile IP"; draft-haverinen-mobileip-gsmsim-01.txt; Internet Engineering Task Force, IETF, CH; Nov. 2000; XP015014135.

METHOD AND APPARATUS FOR BROADCAST SERVICES IN A COMMUNICATION SYSTEM

CLAIM OF PRIORITY UNDER 35 U.S.C. §120

The present application for patent is a continuation of patent application Ser. No. 10/335,626 entitled "Method and Apparatus for Broadcast Services in a Communication System" filed Jan. 2, 2003, pending, and assigned to the assignee hereof and hereby expressly incorporated by reference herein

FIELD

The present invention relates generally to the field of communications, and more particularly, to communications of broadcast services in a communication system.

BACKGROUND

In a wireless communication system, unnecessary and excessive transmissions by a user may cause interference for other users in addition to reducing the system capacity. The unnecessary and excessive transmission may be caused by requesting transmission of unnecessary data in the communication system. A system for broadcast application may require use of specific broadcast parameters. At a time before receiving the broadcast services, a mobile station may request transmission of such broadcast parameters from a serving base station. Such broadcast parameters may include the broadcast modulation format information, data rate information, encryption key information, coding information, broadcast channel frequency information and other similar type information. Several base stations may be controlled by a common broadcast controller. Therefore, as long as the mobile station is within the coverage areas of these base stations, the mobile station does not need to request retransmission of the broadcast parameters. However, the mobile station may not have a reliable way of determining whether a new base station uses the same or different broadcast controller when the mobile station moves to the coverage area of the new base station. As such, the mobile station may request transmission of broadcast parameters every time it moves to the coverage area of a new base station. Requesting and receiving the transmission of the broadcast parameters may interrupt the broadcast services played at the mobile station, and cause unnecessary and excessive transmissions in the communication system.

Therefore, there is a need for a method, apparatus and system for updating a mobile station broadcast parameters for broadcast services in a communication system.

SUMMARY

A method, apparatus and system provide for efficient use of communication resources for providing broadcast services in a communication system. A receiver receives a first broadcast controller identification from a first base station, and a second broadcast controller identification from a second base station. A controller coupled to the receiver determines whether the first and second broadcast controller identifications are associated with use of a common set of broadcast parameters. A transmitter transmits a request for transmission of a new set of broadcast parameters when the first and second broadcast controller identifications are not associated with use of the common set of broadcast parameters. After receiving the new set of broadcast parameters, the receiver uses the new set of broadcast parameters for receiving broadcast services.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Generally stated, a novel and improved system, method and apparatus provide for efficient use of communication resources for broadcast services in a communication system. A set of broadcast parameters is associated with one or more broadcast controllers in accordance with various aspects of the invention. While using a first broadcast controller through a first base station, obtaining a second broadcast controller identification from a second base station triggers a process for determining whether the first and second broadcast controller identifications are associated with a common set of broadcast parameters. Requesting transmission of a new set of broadcast parameters is triggered when the first and second broadcast controller identifications are not associated with a common set of broadcast parameters in accordance with various aspects of the invention. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

More specifically, various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the world wide web at the address: http://www.3gpp2.org, or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Figure 1:
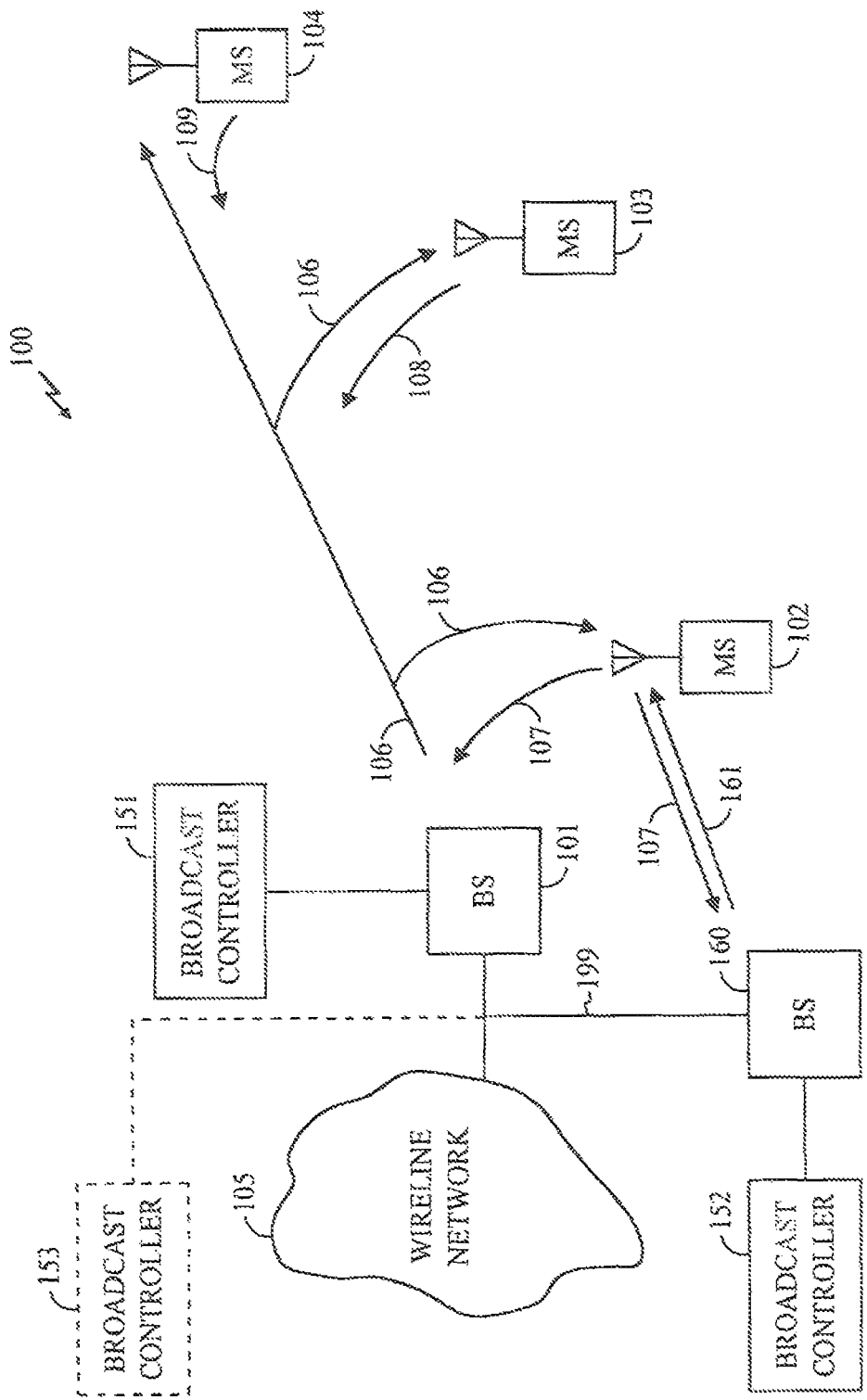
FIG. 1 depicts a communication system capable of providing broadcast services in accordance with various aspects of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102-104, and between the mobile stations 102-104 and a public switch telephone and data network 105. The mobile stations in FIG. 1 may be referred to as data access terminals (AT) and the base station as a data access network (AN) without departing from the main scope and various advantages of the invention. Base station 101 may include a number of components, such as a base station controller and a base transceiver system. For simplicity, such components are not shown. Base station 101 may be in communication with other base stations, for example base station 160. A mobile switching center (not shown) may control various operating aspects of the communication system 100 and in relation to a back-haul 199 between network 105 and base stations 101 and 160.

Base station 101 communicates with each mobile station that is in its coverage area via a forward link signal transmitted from base station 101. The forward link signals targeted for mobile stations 102-104 may be summed to form a forward link signal 106. The forward link may carry a number of different forward link channels. Each of the mobile stations 102-104 receiving forward link signal 106 decodes the forward link signal 106 to extract the information that is targeted for its user. Base station 160 may also communicate with the mobile stations that are in its coverage area via a forward link signal transmitted from base station 160. Mobile stations 102-104 communicate with base stations 101 and 160 via corresponding reverse links. Each reverse link is maintained by a reverse link signal, such as reverse link signals 107-109 for respectively mobile stations 102-104. The reverse link signals 107-109, although may be targeted for one base station, may be received at other base stations.

Base stations 101 and 160 may be simultaneously communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160. For transmitting a packet of data to mobile station 102, one of the base stations 101 and 160 may be selected to transmit the packet of data to mobile station 102. On the reverse link, both base stations 101 and 160 may attempt to decode the traffic data transmission from the mobile station 102. The data rate and power level of the reverse and forward links may be maintained in accordance with the channel condition between the base station and the mobile station.

The communication system 100 may also provide broadcast services to the mobile stations. Broadcast services may include receiving video or audio broadcast through base stations 101 and 160. In another example, the weather or traffic information may be broadcasted for the mobile stations. In a broadcast system, the same signal may be sent simultaneously to a large number of mobile stations. The broadcast signal may be encrypted. Therefore, the mobile stations may need to sign up for such services. The mobile station may need to obtain encryption information from the base station, before receiving the services. In addition, the mobile station may need to receive other broadcast parameters in order to receive the broadcast services. The broadcast parameters may include the broadcast channel identifier, broadcast modulation format information, data rate information, encryption key information, coding information, broadcast channel frequency information, encryption and decryption keys information, header compression information, and other similar type information. The broadcast services may be controlled by a broadcast controller. The broadcast controller provides the broadcast programming, transmission and control of the broadcast services. The broadcast controller also provides the aforementioned broadcast parameters to the authorized mobile stations. The broadcast controller may verify that the mobile station has signed up for the requested broadcast service before providing the broadcast parameters.

The communication system 100 may have one or more broadcast controllers. For example, in one embodiment, the base stations 101 and 160 may use a common broadcast controller 153. A common set of broadcast parameters is provided to base stations 101 and 160, and to the mobile stations within the coverage area of base stations 101 and 160. In accordance with various aspects of the invention, the base stations 101 and 160 transmit a broadcast controller identification. When a mobile station roams into the coverage area of a base station, the mobile station receives the broadcast controller identification. The broadcast controller identification may be transmitted by the base station periodically or transmitted based on a request by a mobile station. In another embodiment, the broadcast controller identification may be included with other information that a mobile station normally acquires from a base station when it roams into the coverage area of the new base station. Various interoperability standards, incorporated herein, provide one or more methods for exchange of information when a mobile station roams into a new coverage area.

In another embodiment, in communication system 100, the base station 101 may use broadcast controller 151, and the base station 160 may use a different broadcast controller 152. The broadcast parameters used by the broadcast controllers 151 and 152 may be different. The broadcast controller identifications received from base stations 101 and 160, therefore, are not associated with a common set of broadcast parameters. As such, when a mobile station roams into the coverage area of base station 160 from coverage area of base station 101, the mobile station needs to receive a new set of broadcast parameters associated with the broadcast controller 1152.

Figure 2:
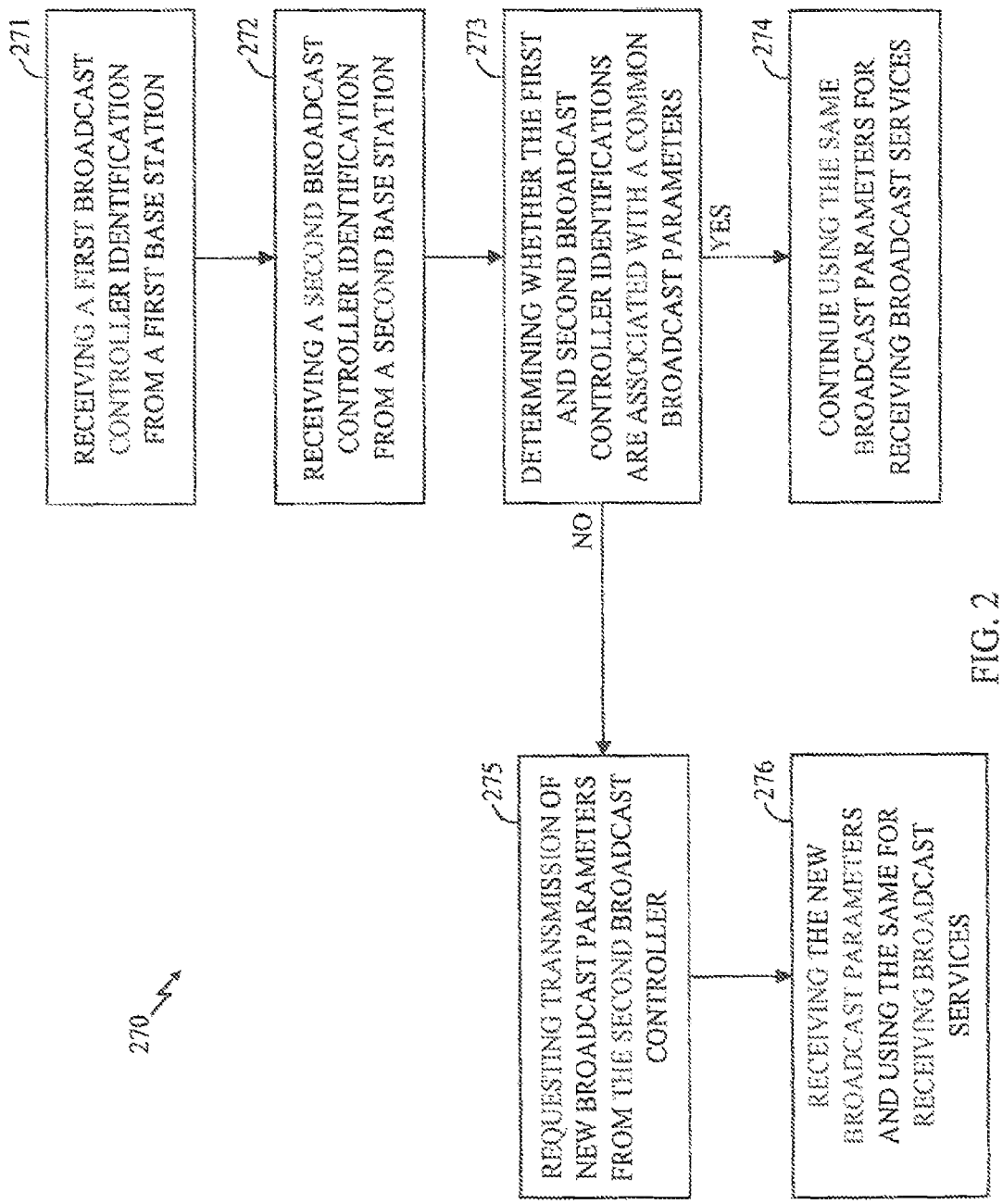
FIG. 2 depicts a flow chart of various steps that may be used for obtaining and updating broadcast parameters of a mobile station for broadcast services in accordance with various aspects of the invention.

Referring to FIG. 2, a flow chart 270 outlines several steps that may be performed by a mobile station roaming from coverage area of a first base station to coverage area of a second base station to efficiently receive and change the broadcast parameters in order to receive broadcast services in communication system 100, in accordance with various aspects of the invention. At step 271, the mobile station, for example mobile station 102 roaming from coverage areas of base station 101 to base station 160, has received a first broadcast controller identification from a first base station, for example base station 101. At step 272, the mobile station receives a second broadcast controller identification from a second base station, for example base station 160. The first broadcast controller identification may be associated with the broadcast controller 151, and the second broadcast controller identification may be associated with the broadcast controller 152. At step 273, the mobile station may determine whether the first and the second broadcast controller identifications are associated with a common broadcast parameters. In one embodiment, the broadcast controllers 151 and 152 may be using the same parameters. In another embodiment, the first and second broadcast controller identifications may be associated to a common broadcast controller 153 that may be used for both the base stations 101 and 160. As such, at step 274, the mobile station continues to use the same broadcast parameters for receiving the broadcast services. At step 275, if the first and the second broadcast controller identifications are not associated with a common broadcast parameters, the mobile station requests transmission of a new set of broadcast parameters from the second broadcast controller, for example broadcast controller 152. The transmission of the parameters may take place by the second base station, for example base station 160. At step 276, the mobile station receives the new set of broadcast parameters and continues to receive broadcast services using the new set of broadcast parameters.

Figure 3:
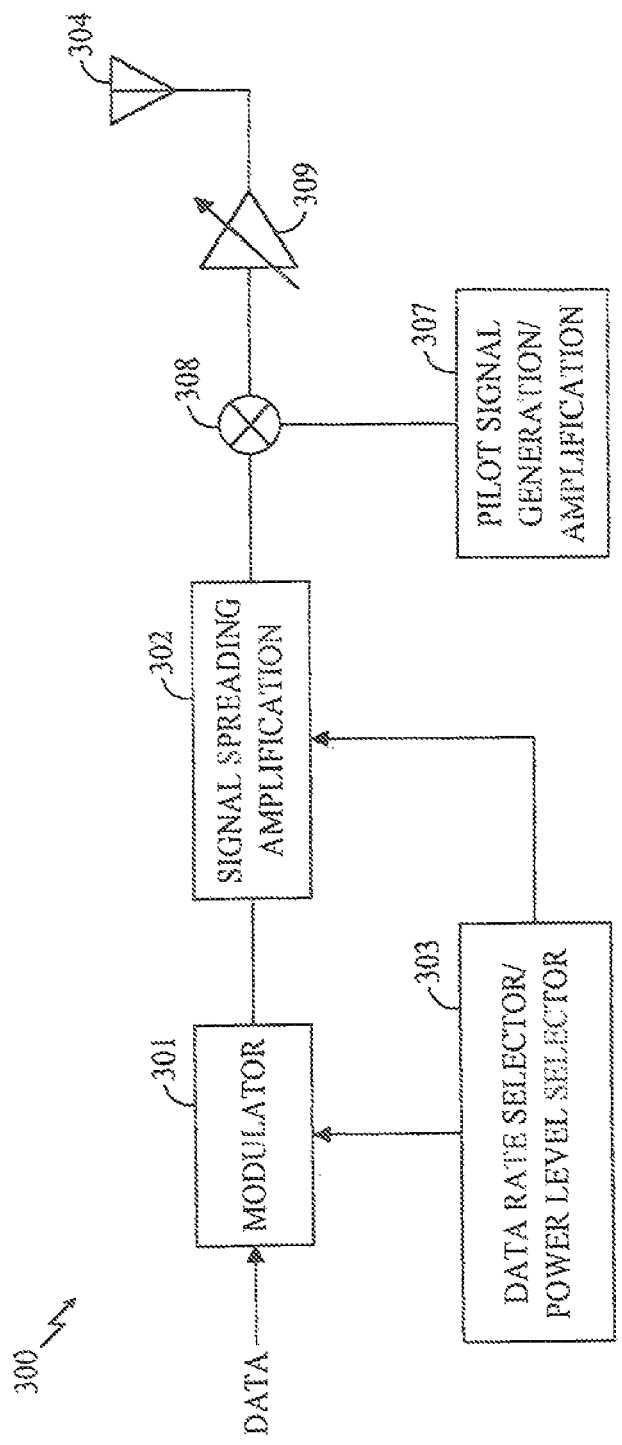
FIG. 3 depicts a transmitter capable of operating in accordance with various aspects of the invention for broadcast services.

FIG. 3 illustrates a block diagram of a transmitter 300 for transmitting the reverse and forward link signals. The transmitter 300 may be used for transmission of fundamental channels, control channels, supplemental channels, and broadcast channels. The broadcast channel data for transmission are input to a modulator 301 for modulation. The modulation may be according to any of the commonly known modulation techniques such as QAM, PSK or BPSK. Before modulation, the broadcast channel data for transmission may pass through one or more layers of coding. The modulation data rate may be selected by a data rate and power level selector 303. The data rate selection may be based on feedback information received from a destination or may be fixed for the broadcast channel. In case of a feedback, the data rate very often is based on the channel condition, among other considered factors. The data rate and power level selector 303 accordingly selects the data rate in modulator 301. The output of modulator 301 passes through a signal spreading operation and amplified in a block 302 for transmission from an antenna 304. The data rate and power level selector 303 also selects a power level for the amplification level of the transmitted signal. The combination of the selected data rate and the power level allows proper decoding of the transmitted data at the receiving destination. A pilot signal is also generated in a block 307. The pilot signal is amplified to an appropriate level in block 307. The pilot signal power level may be in accordance with the channel condition at the receiving destination. The pilot signal may be combined with the channel signal in a combiner 308. The combined signal may be amplified in an amplifier 309 and transmitted from antenna 304. The antenna 304 may be in any number of combinations including antenna arrays and multiple input multiple output configurations. The selected modulation, data rate and the coding technique for transmission of broadcast channel data may be in accordance with the broadcast parameters set forth by the broadcast controller. For example, if the base station 101, incorporating transmitter 300, is transmitting the broadcast channel and the broadcast controller 151 is controlling the broadcast information, the broadcast parameters of the broadcast controller 151 are used in transmitter 300 for transmission of broadcast channel. Therefore, the selected modulation, data rate and the coding technique may be three of the broadcast parameters that need to be communicated to the mobile station in the set of broadcast parameters.

Figure 4:
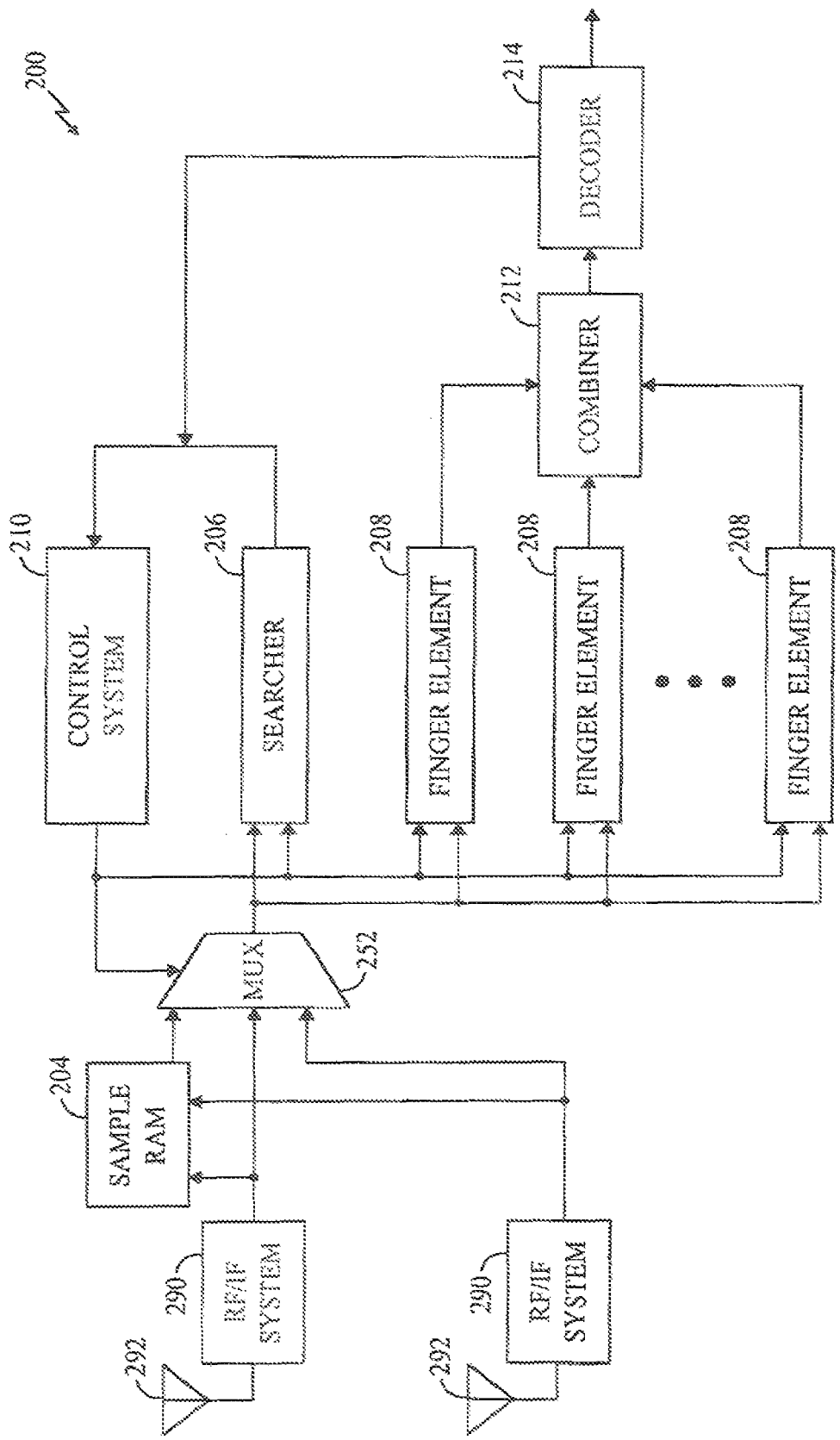
FIG. 4 depicts a receiver capable of operating in accordance with various aspects of the invention for broadcast services.

FIG. 4 illustrates a block diagram of a receiver 200 used for processing and demodulating the received CDMA signal while operating in accordance with various aspects of the invention. Receiver 200 may be used for decoding the information on the reverse and forward links signals. Receiver 200 may be used for decoding information on the fundamental channel, control channel, supplemental channels, and the broadcast channels. Received (Rx) samples may be stored in RAM 204. Receive samples are generated by a radio frequency/intermediate frequency (RF/IF) system 290 and an antenna system 292. The RF/IF system 290 and antenna system 292 may include one or more components for receiving multiple signals and RF/IF processing of the received signals for taking advantage of the receive diversity gain. Multiple received signals propagated through different propagation paths may be from a common source. Antenna system 292 receives the RF signals, and passes the RF signals to RF/IF system 290. RF/IF system 290 may be any conventional RF/IF receiver. The received RF signals are filtered, downconverted and digitized to form RX samples at base band frequencies. The samples are supplied to a multiplexer (mux) 252. The output of mux 252 is supplied to a searcher unit 206 and finger elements 208. A control system 210 is coupled thereto. A combiner 212 couples a decoder 214 to finger elements 208. Control system 210 may be a microprocessor controlled by software, and may be located on the same integrated circuit or on a separate integrated circuit. The decoding function in decoder 214 may be in accordance with a turbo decoder or any other suitable decoding algorithms. The signal transmitted from a source may be encoded with several layers of codes. As such, the decoder 214 decodes the received samples in accordance with such codes. The decoder 214 may perform decoding function in accordance with the coding information received in the broadcast parameters.

During operation, received samples are supplied to mux 252. Mux 252 supplies the samples to searcher unit 206 and finger elements 208. Control unit 210 configures finger elements 208 to perform demodulation and despreading of the received signal at different time offsets based on search results from searcher unit 206. The results of the demodulation are combined and passed to decoder 214. The demodulation function may be performed in accordance with the modulation information received in the broadcast parameters. Decoder 214 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. Receiver 200 may be used in a receiver portion of base stations 101 and 160 for processing the received reverse link signals from the mobile stations, and in a receiver portion of any of the mobile stations for processing the received forward link signals.

Figure 5:
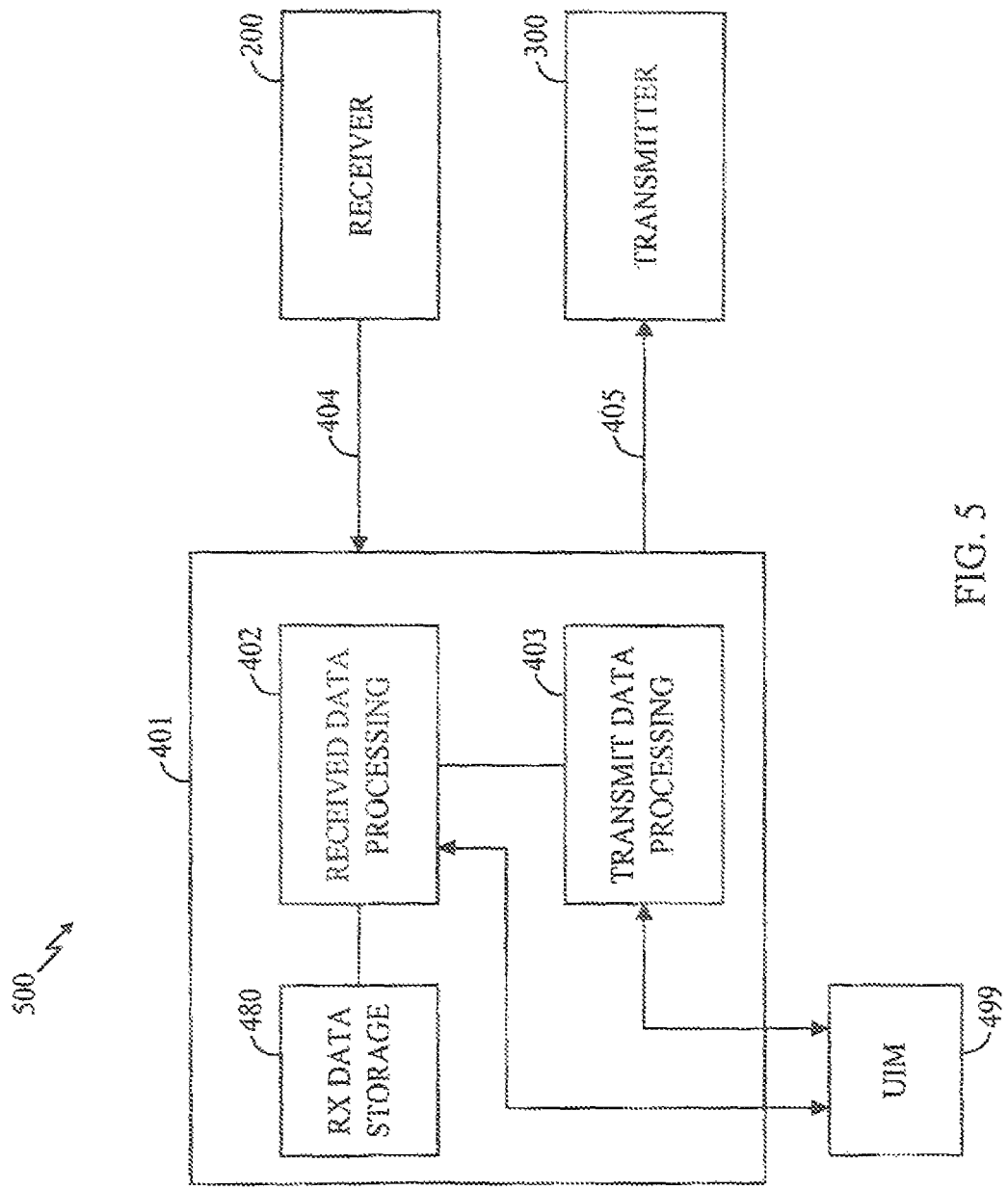
FIG. 5 depicts a transceiver system capable of operating in accordance with various aspects of the invention for broadcast services.

FIG. 5 depicts a general diagram of a transceiver system 500 for incorporating receiver 200 and transmitter 300 for maintaining a communication link with a destination, including receiving broadcast channels. The transceiver 500 may be incorporated in a mobile station or a base station. A processor 401 may be coupled to receiver 200 and transmitter 300 to process the received and transmitted data. Various aspects of the receiver 200 and transmitter 300 may be common, even though receiver 200 and transmitter 300 are shown separately. In one aspect, receiver 200 and transmitter 300 may share a common local oscillator and a common antenna system for RF/IF receiving and transmitting. Transmitter 300 receives the data for transmission on input 405. Transmit data processing block 403 prepares the data for transmission on a transmit channel. If the transmit channel is a broadcast channel, the processing of data is in accordance with the broadcast parameters used by the transceiver 500. Received data, after being decoded in decoder 214, are received at processor 401 at an input 404. Received data are processed in received data processing block 402 in processor 401. If the received channel is a broadcast channel, the processing of the received broadcast data is in accordance with the broadcast parameters used by the transmitter for transmitting the broadcast channel. Various operations of processor 401 may be integrated in a single or multiple processing units. The transceiver 500 may be connected to another device. The transceiver 500 may be an integral part of the device. The device may be a computer or operates similar to a computer. The device may be connected to a data network, such as Internet. In case of incorporating the transceiver 500 in a base station, the base station through several connections may be connected to a network, such as Internet.

The processing of the received data generally includes checking for error in the received packets of data. For example, if a received packet of data has error at an unacceptable level, the received data processing block 402 sends an instruction to transmit data processing block 403 for making a request for retransmission of the packet of data. The request is transmitted on a transmit channel. However, for the broadcast channel, the receiver operation may not include a request for retransmission. The broadcast service may include sending video from the base station and playing the same video at the mobile station. The broadcast channel data may be transmitted in a block of data at a time. As such, the receive data storage block 480 may accumulate data received in each frame of data to reconstruct the block of data for the playing the video of the broadcast services at the mobile station.

A broadcast controller, such as any of the broadcast controllers 151, 152 and 153, may control broadcast services of a large number of base stations in a communication system. A set of base stations may form a subnet of base stations. The base station may transmit a subnet identifier to the mobile stations. The subnet identifier identifies the subnet. All base stations in a subnet may be served by the same broadcast controller. The subnet identification sent from each base station in a subnet may indicate that they belong to a common subnet in accordance with various aspects of the invention. As such, when the mobile station is roaming among the base stations of a subnet, the mobile station uses the same broadcast parameters for broadcast services. In accordance with various aspects of the invention, the mobile station determines, while referring to FIG. 2, at step 273, whether the first and second base stations belong to a common subnet having a common broadcast controller, and hence a common broadcast controller identification and common broadcast parameters. As such, when the first and second base stations belong to a common subnet, the mobile station uses the same broadcast parameters for broadcast services. When the first and second base stations belong to different subnets, at steps 275 and 296, the mobile station may request and receive a new set of broadcast parameters.

Figure 6:
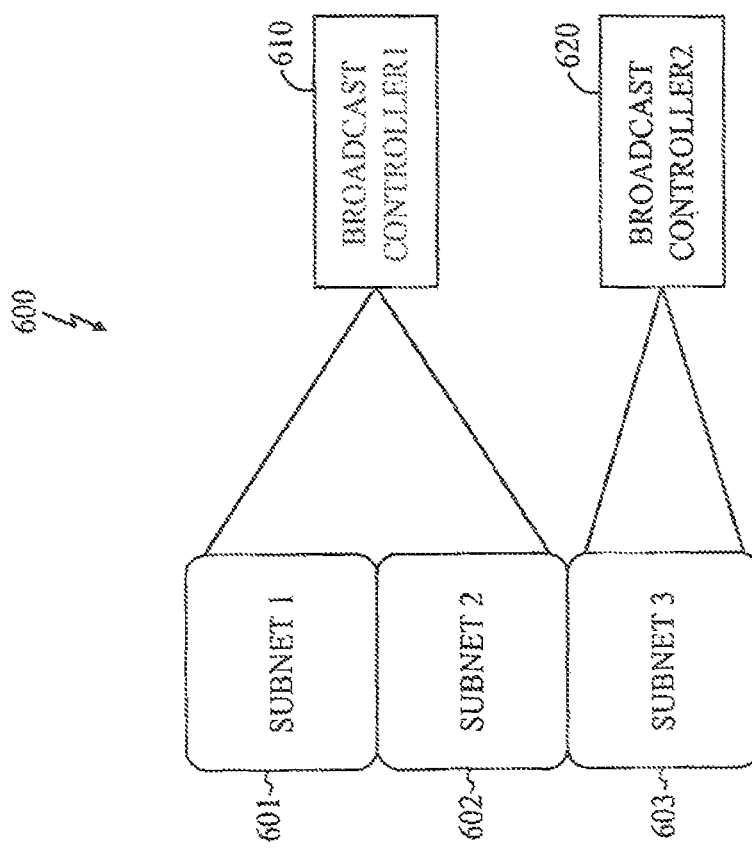
FIG. 6 depicts at least one configuration of a communication system subnets and broadcast controllers for broadcast services.

Moreover, several subnets may be controlled by a common broadcast controller, in another exemplary embodiment. Referring to FIG. 6, an exemplary communication system subnets configuration 600 is shown. The broadcast controller 610 may control the broadcast services of all the base stations in the subnet 601 and subnet 602. The broadcast controller 620 may control the broadcast services of all the base stations in the subnet 603. As such, when the mobile station determines that the base station belongs to different subnets, the mobile station and/or base station determines whether the mobile station needs a new set of broadcast parameters. The communication for determining whether a new set of broadcast parameters are necessary may be via communications of several messages. For example, the base station may determine whether the subnet of the previous base station and the subnet of the current base station are served by the same broadcast controller. The base station may perform this function by maintaining a list of other subnets served by the broadcast controller that serves this base station. In another embodiment, either the base station or the broadcast controller sends to the mobile station a list of subnets controlled by a common broadcast controller. The list may also be the identifiers for identifying the base station members of each subnet. This list of subnets may be sent to the mobile station along with the broadcast parameters. When the mobile station enters the coverage area of a base station belonging to a different subnet, the mobile stations checks whether the new subnet is included in the list of subnets controlled by the current broadcast controller. If so, the mobile station continues to use the current broadcast parameters. Otherwise, the mobile station requests from the new broadcast controller for a new set of broadcast parameters. Since the list of subnets may be very large, the broadcast controller may provide the mobile station only a partial list of subnets controlled by the broadcast controller. This list may be updated as the mobile station moves to the edge of the subnets included in the current list. In another embodiment, the information may be encoded by indicating a series of consecutive subnet identification numbers. The message, therefore, may include the first and last subnet identification (or base station identification numbers) of the series of consecutive subnets (or base stations) identification numbers. In another embodiment, the base stations bordering the coverage areas may transmit a message indicating a need for requesting a new set of broadcast parameters because the mobile station may be entering the coverage area of a base station in a subnet controlled by a different broadcast controller. In such a case, when the mobile station roams from a base station of a first subnet controlled by a first broadcast controller to another base station of a second subnet controlled by a second broadcast controller, the mobile station sends a request to the second base station for transmission of the broadcast parameters associated with the second broadcast controller.

The broadcast channel may transmit encrypted data to prevent unauthorized users from using the broadcast services. A user identity module (UIM) 499 shown in FIG. 5 may contain user specific information including an encryption key. Two patent applications filed with assigned Ser. Nos. 09/933,972 and 10/233,188, with the title: Method and Apparatus for Security in a Data Processing System, assigned to the assignee of the present application, details various embodiments for encrypted communications, incorporated by reference herein. The UIM 499 is associated with a particular user and is used primarily to verify that a mobile station incorporating transceiver 500 is entitled to the privileges afforded to the user, such as access to the mobile phone network. Therefore, a user is associated with the UIM 499 rather than a mobile station. The same user may be associated with multiple UIM 499.

The broadcast service faces a problem in determining how to distribute keys to subscribed users. To decrypt the broadcast content at a particular time, the mobile station must know the current decryption key that is valid in the current subnet. To avoid theft-of-service, the decryption key should be changed frequently, for example, every minute. These decryption keys are called Short-term Keys (SK). The SK is used to decrypt the broadcast content for a short-amount of time. The SK is derived from a Broadcast Access Key that may be stored in the UIM. The list of subnets controlled by a broadcast controller may be stored in the UIM along with the Broadcast Access Key. The mobile station may need to obtain the Broadcast Access Key from the broadcast controller in the set of broadcast parameters. The UIM receives an identifier for the current subnet along with a request to compute the SK. The UIM may check if the Broadcast Access Key is valid in the current subnet. If the Broadcast Access Key is not valid in the current subnet, the UIM may send an indication to initiate a process to obtain a new key from the new broadcast controller to continue the reception of broadcast services.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for providing broadcast services, comprising:
   receiving a first identification from a first base station;
   receiving a second identification from a second base station;
   determining whether the first and second identifications are associated with use of a common set of broadcast parameters; and
   requesting transmission of a new set of broadcast parameters from the second base station if the first and second identifications are not associated with use of the common set of broadcast parameters.

2. The method as recited in claim 1, further comprising:
   continuing to use the common set of broadcast parameters if the first and second identifications are associated with use of the common set of broadcast parameters.

3. The method as recited in claim 1, further comprising:
   receiving said new set of broadcast parameters.

4. The method as recited in claim 3, further comprising:
   using said new set of broadcast parameters for receiving broadcast services.

5. An apparatus for providing broadcast services, comprising:
   a receiver for receiving a first identification from a first base station, and for receiving a second identification from a second base station;
   a controller for determining whether the first and second identifications are associated with use of a common set of broadcast parameters;
   a transmitter for requesting transmission of a new set of broadcast parameters from the second base station if the first and second identifications are not associated with use of the common set of broadcast parameters.

6. The apparatus as recited in claim 5, wherein said receiver continues to use the common set of broadcast parameters; if the first and second identifications are associated with use of the common set of broadcast parameters.

7. The apparatus as recited in claim 6, wherein said controller and receiver are further for using said new set of broadcast parameters for receiving broadcast services.

8. An apparatus for providing broadcast services, comprising:
   means for receiving a first identification from a first base station;
   means for receiving a second identification from a second base station;
   means for determining whether the first and second identifications are associated with use of a common set of broadcast parameters; and
   means for requesting transmission of a new set of broadcast parameters from the second base station if the first and second broadcast controller identifications are not associated with use of the common set of broadcast parameters.

9. The apparatus as recited in claim 8, further comprising:
   means for continuing to use the common set of broadcast parameters if the first and second identifications are associated with use of the common set of broadcast parameters.

10. The apparatus as recited in claim 8, further comprising:
means for receiving said new set of broadcast parameters.

11. The apparatus as recited in claim 10, further comprising:
means for using said new set of broadcast parameters for receiving broadcast services.

12. A processor-readable medium including processor-executable instructions encoded thereon for performing a method for providing broadcast services, the method comprising:
receiving a first identification from a first base station;
receiving a second identification from a second base station;
determining whether the first and second identifications are associated with use of a common set of broadcast parameters; and
requesting transmission of a new set of broadcast parameters from the second base station if the first and second broadcast controller identifications are not associated with use of the common set of broadcast parameters.

13. The processor-readable medium as recited in claim 12, wherein the method further comprises:
continuing to use the common set of broadcast parameters if the first and second identifications are associated with use of the common set of broadcast parameters.

14. The processor-readable medium as recited in claim 12, wherein the method further comprises:
receiving said new set of broadcast parameters.

15. The processor-readable medium as recited in claim 14, wherein the method further comprises:
using said new set of broadcast parameters for receiving broadcast services.

16. A mobile station, comprising:
a receiver for receiving a first identification from a first base station, and for receiving a second identification from a second base station;
a controller for determining whether the first and second identifications are associated with use of a common set of broadcast parameters;
a transmitter for requesting transmission of a new set of broadcast parameters from the second base station if the first and second identifications are not associated with use of the common set of broadcast parameters; and
an antenna coupled to the receiver to receive the first and second identifications, the antenna further coupled to the transmitter to request the transmission of the new set of broadcast parameters.

\* \* \* \* \*